United States Patent [19]

Hartig et al.

[11] Patent Number: 4,640,402

[45] Date of Patent: Feb. 3, 1987

[54] CLUTCH DISC

[75] Inventors: Franz Hartig, Dittelbrunn; Matthias Fischer, Euerbach; Dagwin Tomm, Kaiserslautern, all of Fed. Rep. of Germany

[73] Assignee: Fichtel & Sachs AG, Scheweinfurt, Fed. Rep. of Germany

[21] Appl. No.: 712,352

[22] Filed: Mar. 15, 1985

[30] Foreign Application Priority Data

Mar. 17, 1984 [DE] Fed. Rep. of Germany ....... 3409869

[51] Int. Cl.⁴ .......................... F16D 3/14; F16D 3/66; F16D 13/75
[52] U.S. Cl. .............................. 192/106.2; 192/106.1; 192/110 R
[58] Field of Search ............... 192/70.17, 106.1, 106.2, 192/110 R; 464/68, 66

[56] References Cited

U.S. PATENT DOCUMENTS 4,465,172 8/1984 Gatewood ........................ 192/106.2
4,548,308 10/1985 Little .................................. 464/68 X

FOREIGN PATENT DOCUMENTS 688630 2/1940 Fed. Rep. of Germany.
2742524 3/1978 Fed. Rep. of Germany ... 192/106.2
204320 12/1982 Japan ................................ 192/106.1

Primary Examiner—Rodney H. Bonck
Attorney, Agent, or Firm—Toren, McGeady and Goldberg

[57] ABSTRACT

The clutch disc for a motor vehicle friction clutch comprises a hub and a friction lining carrier mounted rotatably on the hub. A torsional vibration spring means is arranged in the torque transmission path between the friction lining carrier and the hub. A torsional vibration damper comprises at least two friction elements lying axially resiliently flat against one another. One of the friction elements is connected non-rotatably with the hub and the other friction element is connected non-rotatably with the friction lining carrier. One of the friction elements is held displaceably in the radial direction, along the friction face of the other friction element, on the hub or the friction lining carrier. By radial adjustment of the friction element the friction torque can be adjusted and construction tolerances of the clutch disc can be compensated.

23 Claims, 13 Drawing Figures

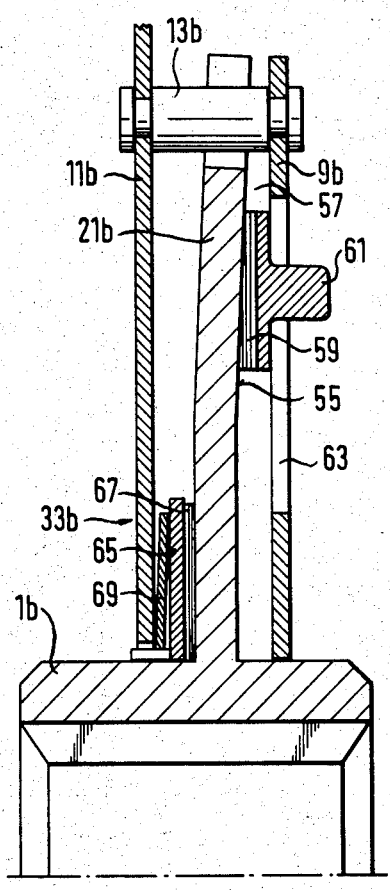
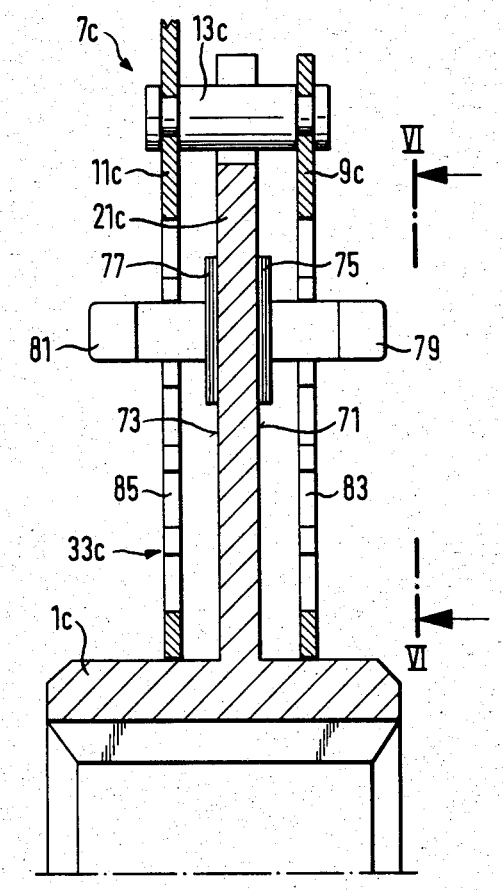
FIG. 4
FIG. 5
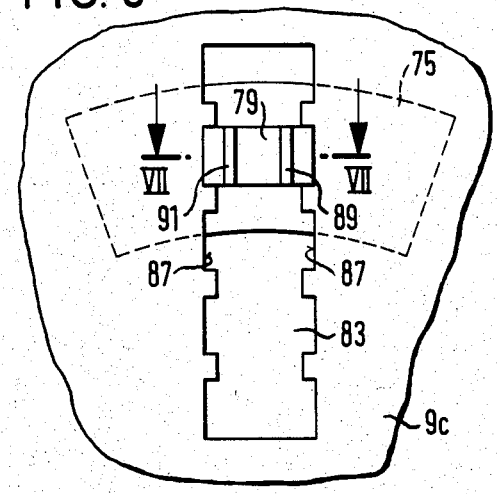
FIG. 6
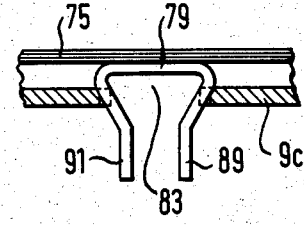
FIG. 7

U.S. Patent  Feb. 3, 1987  Sheet 4 of 4  4,640,402
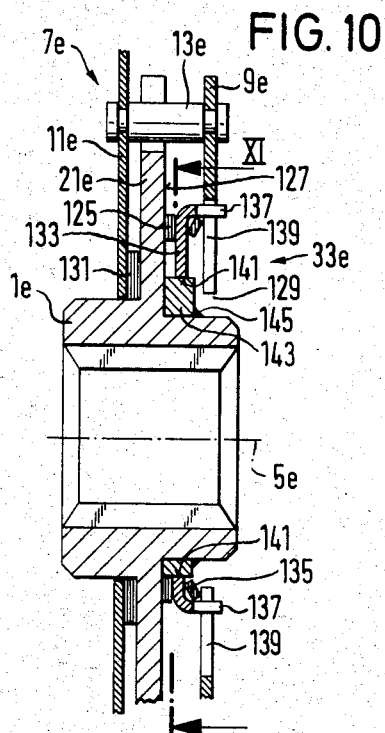
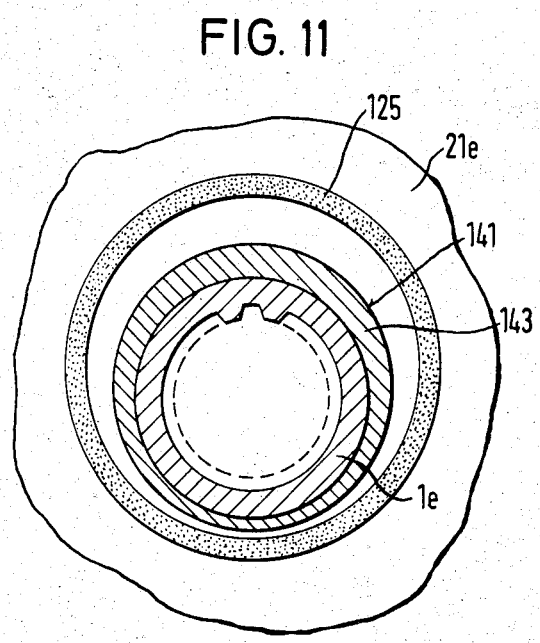
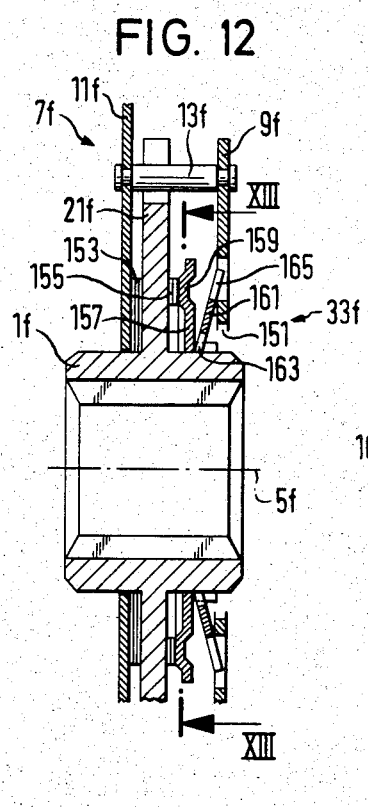
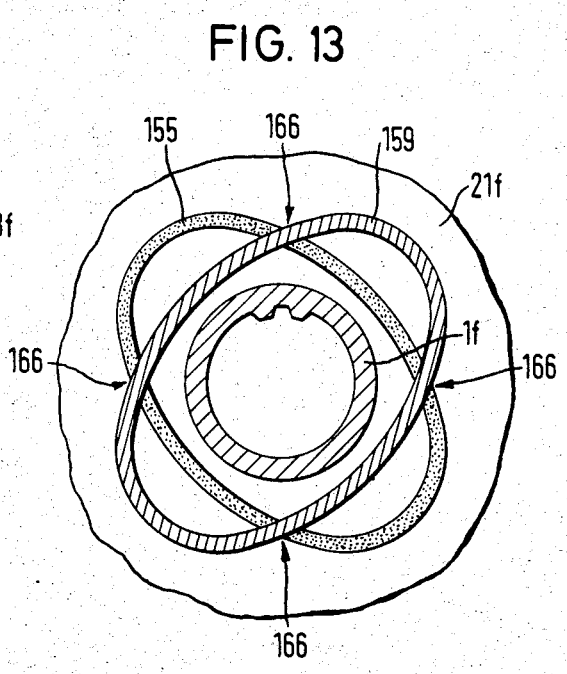

CLUTCH DISC

BACKGROUND OF THE INVENTION

The invention relates to a clutch disc for a motor vehicle friction clutch which comprises a torsional vibration spring means and a torsional vibration friction damper.

The friction torque of the friction damper of conventional clutch discs is greatly dependent upon the manufacturing tolerances of the individual components and the spring force tolerances of the stressing spring of the friction damper, and can fluctuate greatly. On the other hand the friction torque must be maintained within narrow tolerance limits if rotating vibrations are to be optimally damped. In conventional clutch discs with a friction damper arranged in protected manner between axially lateral side parts, the clutch disc must be dismantled and re-fitted after working, if the friction torque does not lie within the required tolerance limits.

STATEMENT OF PRIOR ART

From German Pat. No. 688,630 a clutch disc for a motor vehicle friction clutch is known, on the hub of which a friction lining carrier is mounted rotatably through a limited angle of rotation. A torsional vibration spring means is arranged in the torque transmission path between the hub and the friction lining carrier. The known clutch disc further comprises a torsional vibration friction damper having a plurality of mutually independently adjustable friction units. Each of the friction units comprises friction discs abutting externally on a disc of the friction lining carrier. The friction discs are seated in openings of side discs of the hub which are arranged axially to both sides of the friction lining carrier disc. A likewise externally arranged helical compression spring stresses the friction discs towards one another. The stress force of each spring is adjustable by means of a nut and a clamp bolt axially penetrating the clutch disc. The friction damper of this known clutch disc is unprotected, so that the friction torque can vary in operation. Furthermore it is difficult to monitor whether the friction units are adjusted uniformly. Friction units adjusted to excessive spring stress wear prematurely, which shortens the life of the clutch disc. Finally the axial overall height of the clutch disc is relatively great.

OBJECT OF THE INVENTION

It is an object of the invention to provide a clutch disc for a motor vehicle friction clutch, the torsional vibration friction damper of which can be adjusted to predetermined friction torque values, particularly without variation of its spring stress.

SUMMARY OF THE INVENTION

The invention is based upon a clutch disc, the torsional vibration friction damper of which comprises at least two friction elements or friction faces lying axially resiliently flat against one another. One of the friction elements is connected non-rotatably with the hub of the clutch disc and the other friction element is connected non-rotatably with the friction lining carrier thereof. The above problem is solved in accordance with the invention in that one of the friction elements is held adjustably movably along the friction surface of the other friction element on the hub or the friction lining carrier in such a way that the friction area overlapped by the friction elements is adjustable radially in relation to the rotation axis. The effective friction face region is displaced radially by the adjustment, whereby the friction torque varies with the stress spring force and thus friction force remaining constant.

By a friction element there is to be understood here and below any component generating a friction torque, with or without lining of a special friction material. More especially, it should be emphasized that at least one of the friction elements can also be formed by a construction component of the clutch disc, by way of example by a substantially radially protruding hub flange of the hub, or one of the side discs of the friction lining carrier.

The hub and the friction lining carrier ordinarily comprise disc parts arranged axially side-by-side which are utilized for the axial and/or radial mounting of the friction lining carrier on the hub. With only comparatively low constructional expense it is possible to make the friction torque of the friction damper adjustable if one of the two friction elements lying flat against one another is formed as a friction segment and guided non-rotatably but radially displaceably on one of the disc parts or a thrust ring connected non-rotatably with it. The friction damper can be assembled exclusively with use of such radially adjustable friction segments; it can however also comprise conventional non-adjustable friction damper units to which an additional adjustable friction segment is allocated.

The radially displaceable friction segment can carry a protuberance which is guided in a radial slot of the disc part or of the thrust ring connected non-rotatably with it. The slot ensures the non-rotatable coupling of the friction segment with the hub or the friction lining carrier and can furthermore be utilized for the radial fixing of the friction segment. By way of example the protuberance can be formed as an angled tab which is angled off in relation to the slot edges. Alternatively the protuberance can also be fixed by other methods after the adjustment of the friction torque, for example by adhesion or welding. Finally in the longitudinal direction of the slot detent elements can be provided on which the friction segment can be detained.

Particularly in the last-mentioned embodiment with friction segments detainable on the slot edges, an extensive simplification of the friction damper can be achieved if as detent element there is utilized an arched spring which at the same time takes over the function of the stressing spring and not only detains the detent segment on the detent elements of the slot but also stresses it axially towards the other friction element of the friction damper.

In some practical cases the range in which the friction torque can be varied by radial displacement of the friction segment does not suffice for the compensation of the friction torque error caused by tolerance fluctuations. The torque adjustment range is increased if in addition to the effective friction force radius the stress force of the stressing spring of the friction damper is also adjusted. This can be achieved in a simple manner in that the hub flange and at least one of the side discs of the friction lining carrier are inclined radially outwards towards one another and form between them a radially outwardly narrowing gap in which the friction element is radially displaceably guided. The friction element is seated in the stress force path of the stressing spring and reduces the axial installation height available for the stressing spring, with decreasing axial width of the gap. By displacement of the friction segment radially outwards, not only the friction force radius but also the stress force of the stressing spring is increased. The stressing spring can be arranged together with the friction segment in the gap, but it can also be arranged on the axially opposite side of the hub flange and can be supported through the friction lining carrier on the friction segment.

In another embodiment the friction segment is on the one hand displaceably guided along a spiral groove wound about the rotation axis, and on the other hand guided radially displaceably on a radial guide connected non-rotatably with one of the disc parts. The distance from the rotation axis effective for the friction torque can be adjusted by rotation of the radial guide in relation to the spiral guide groove. The spiral guide groove can contain several friction segments which are adjusted simultaneously and in common in a predetermined manner.

Friction dampers with a friction face of comparatively large area but nevertheless radially adjustable are obtained if at least one of the two friction elements lying flat against one another is formed as a friction ring enclosing the rotation axis and is guided non-rotatably but axially displaceably on one of the disc parts. The friction ring is mounted rotatably on a radially eccentric ring. The eccentric ring is in turn held non-rotatably but rotationally adjustable about the rotation axis of the clutch disc, particularly on the hub. By rotation of the eccentric in relation to the hub, the area center of gravity of the friction ring is radially displaced and thus the friction torque is varied. This embodiment has the advantage that it is relatively insensitive to centrifugal forces and can easily be secured against unintended shifting.

In an embodiment in which the two friction elements lying flat against one another have elongated friction faces extending at an angle to one another, similar advantages are obtained, if one of the friction elements is guided non-rotatably but rotatably adjustable about the rotation axis either on the hub or the friction lining carrier. By rotation of the two friction faces in relation to one another about the rotation axis it is possible to adjust the distance of the effective, overlapped friction face region from the rotation axis and thus the friction torque.

In such a friction damper the friction torque varies even during damping operation in dependence upon the angle of rotation of the friction lining carrier in relation to the hub. In so far as the dependence of the friction torque upon the rotation angle is undesired, by suitable dimensioning of the friction damper for small maximum relative rotation angles it is possible to achieve the object that the friction torque varies only within the permissible tolerance range.

The friction elements are preferably formed as friction rings with radial distance from the rotation axis varying in the circumferential direction, and preferably have a substantially elliptical form.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF DRAWINGS

In the drawings:

FIG. 4 shows an axial longitudinal section through a variant of the friction damper according to FIG. 2, in which the force of a stressing spring is additionally adjustable;

FIG. 5 shows an axial longitudinal section through a friction damper adjustable in steps and usable in the clutch disc according to FIG. 1;

FIG. 6 shows a lateral elevation of the friction damper seen along a line IV—IV in FIG. 5;

FIG. 7 shows a detail view of a friction segment of the friction damper seen along a line VII—VII in FIG. 6;

FIG. 10 shows an axial longitudinal section through a friction damper usable in the clutch disc according to FIG. 1, the friction ring of which damper is radially displaceable;

FIG. 11 shows an axial cross-section through the friction damper seen along a line XI—XI in FIG. 10;

FIG. 12 shows an axial longitudinal section through a friction damper with elliptical friction elements, usable in the clutch disc according to FIG. 1; and FIG. 13 shows an axial cross-section through the friction damper seen along a line XIII—XIII in FIG. 12.

DESCRIPTION OF PREFERRED EMBODIMENTS

Figure 1:
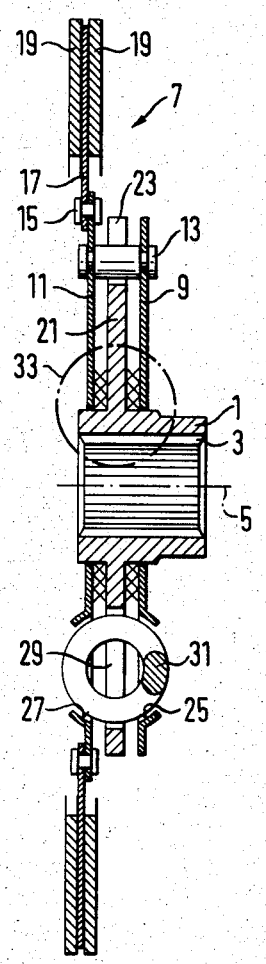
FIG. 1 shows an axial longitudinal section through a clutch disc with a torsional vibration spring means and an adjustable torsional vibration friction damper for a motor vehicle friction clutch.

FIG. 1 shows the fundamental construction of a clutch disc for a motor vehicle friction clutch. The clutch disc comprises a hub 1 of substantially sleeve form which is couplable to its internal toothing 3 non-rotatably but axially displaceably with an input shaft (not shown further) of a motor vehicle gear, rotatable about a rotation axis 5. A friction lining carrier 7 is mounted rotatably through a limited rotation angle about the rotation axis 5 on the hub 1. The friction lining carrier 7 comprises two side discs 9, 11 formed as sheet-metal-shaped parts of substantially annular disc form which are firmly connected with one another with axial spacing from one another by distance rivets 13 or the like. A driver disc 17 likewise of annular disc form in turn carrying clutch friction linings 19 on both axial sides is secured with rivets 15 to the external circumference of the side disc 11. A hub flange 21 of disc form protruding substantially radially from the hub 1 extends axially between the side disc 9, 11. The distance rivets 13 pass through apertures 23 on the circumference of the hub flange 21 and limit the angle of rotation of the friction lining carrier 7 in relation to the hub 1.

On the side discs 9, 11 and the hub flange 21 there are provided windows 25, 27 and 29 respectively, substantially axially aligned with one another when the clutch disc is in the rest position, in which windows helical compression springs 31 are seated. The helical compression springs 31 are subjected to compression stress in the relative rotation of the friction lining carrier 7 and the hub 1 and form a torsional vibration spring means. FIG. 1 shows only one of several helical compression springs 31 arranged in distribution in the circumferential direction.

An adjustable torsional vibration friction damper, explained in greater detail below in various embodiments, is arranged at 33 in FIG. 1. The friction torque of the friction damper 33 is adjustable when the clutch disc is assembled, in order that component tolerances of the clutch disc may be compensated. For this purpose the friction damper 33 comprises friction elements, the radial position of which is adjustable in relation to one another.

In the following explanation of different embodiments of friction dampers, components which have been explained by reference to the clutch disc according to FIG. 1 are designated by the same reference numerals and additionally by a letter. For more detailed explanation of the components designated with the same reference numerals, reference will be made to the description of FIG. 1.

Figure 2:
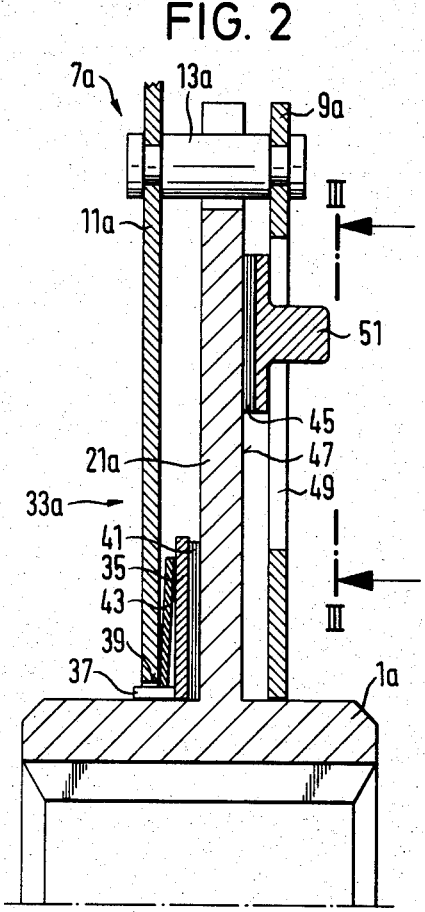
FIG. 2 shows an axial longitudinal section through a friction damper with steplessly adjustable, radially guided friction segment, usable in the clutch disc according to FIG. 1.
Figure 3:
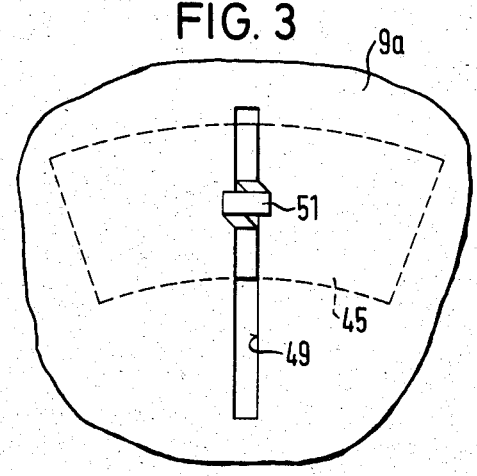
FIG. 3 shows an axial cross-section through the friction damper seen along a line III—III in FIG. 2.

FIGS. 2 and 3 show a friction damper 33a, the friction torque of which is adjustable within predetermined limits, without variation of its spring stress, with the clutch disc assembled. The friction lining carrier 7a is guided rotatably but axially movably on the hub 1a by means of its side disc 9a. The side disc 11a is connected into one unit with the side disc 9a by means of the distance rivets 13a. A thrust ring 35 carrying tongues 37 pointing axially away from the hub flange 21a on its internal circumference is arranged axially between the hub flange 21a and the side disc 11a. The tongues 37 engage in apertures 39 on the internal circumference of the side disc 11a and guide the thrust ring 35 non-rotatably but axially displaceably on the side disc 11a. A friction ring 41 is arranged axially between the thrust ring 35 and the hub flange 21a. A dished spring 43 is braced in axially between the side disc 11a and the thrust ring 35.

A friction segment 45, which is pressed by the dished spring 43 through the side disc 11a, the distance rivets 13a and the side disc 9a against the friction face 47 of the hub flange 21a extending perpendicularly to the axis at least in the region of the friction segment 45, is arranged axially between the hub flange 21a and the side disc 9a. In order that the mean friction force radius of the friction segment 45 may be adjusted, the friction segment 45 is guided non-rotatably but radially displaceably on the side disc 9a. For this purpose, in the side disc 9a there is provided a radially extending slot 49 through which an offset tab 51 protruding axially on the side of the friction segment 45 remote from the hub disc passes and is angled off on the side of the side disc 9a axially remote from the hub flange 21a, in the position of the desired friction torque, for the radial fixing of the friction segment 45.

In FIG. 2 only one friction segment 45 is represented; alternatively it is also possible to provide several friction segments offset in relation to one another in the circumferential direction and/or radially. Each friction segment can be guided on several angled-off tabs and possibly several slots of the side disc 9a.

FIG. 4 shows a friction damper 33b which differs from the friction damper 33a only in that its friction face 55, corresponding to the friction face 47 of the friction damper 33a, and the side disc 9b extending in a plane perpendicular to the axis form a radially outwardly narrowing gap 57 in which a friction segment 59 likewise of wedge form is radially displaceably guided. The friction segment 59 carries again an angled-off tab 61 on its side axially remote from the hub flange 21b which tab engages through a radial slot 63 of the side disc 9b and can be offset on the outside of the side disc 9b. The effective friction force radius and thus the friction torque can be adjusted by means of the friction segment 59 guided non-rotatably but radially adjustably on the side disc 9b.

In dependence upon the radial position of the friction segment 59, the axial position of the side disc 9b and of the side disc 11b secured thereto through the distance rivets 13b from the hub flange 21b varies. There is corresponding variation of the installation height of the dished spring 69 braced in by means of the thrust ring 65 and a friction ring 67 on the hub flange 21b for the one part and the side disc 11b for the other. With increasing effective friction force radius of the friction segment 59, the installation height of the dished spring 69 decreases and thus so does its initial stress force, increasing the friction torque.

FIGS. 5 to 7 show a friction damper 33c with friction torque adjustable in steps. The side discs 9c and 11c of the friction lining carrier 7c are connected into one unit by distance rivets 13c and guided rotatably on the hub 1c on both sides of a hub flange 21c protruding radially from the hub 1c. The hub flange 21c has friction faces 71, 73 extending normal to the axis on axially opposite sides, on which friction segments 75, 77 rest flat. The friction segments 75, 77 each carry arched springs 79 and 81 on their side axially remote from the hub flange 21c. The arched springs 79, 81 engage through radially extending slots 83 and 85 respectively, of the side discs 9c, 11c and guide the friction segments 75, 77 non-rotatably but radially adjustably on the side discs 9c, 11c.

FIGS. 6 and 7 show details of the fixing and guidance of the friction segments 75, 77 for the friction segment 75. The radial longitudinal edges of the slot 83 are provided with a plurality of cut-out portions 87 arranged in the radial direction at distance from one another, in which the two circumferentially resilient legs 89, 91 of the arched spring 79, arranged with spacing from one another in the circumferential direction, engage and detain the friction segment 75 on the side disc 9c.

In the region of the radial longitudinal edges of the slot 83 the legs 89, 91 converge on one another away from the hub flange 21c. Thus the arched springs 79 and 81 generate stress forces directed axially towards one another which press the friction segment 75, 77 against the friction faces 71, 73. An additional stressing spring is not necessary. By compression of the legs 89, 91 in the circumferential direction, the detent engagement can be released and the effective friction force radius and thus the friction torque can be adjusted.

Figure 9:
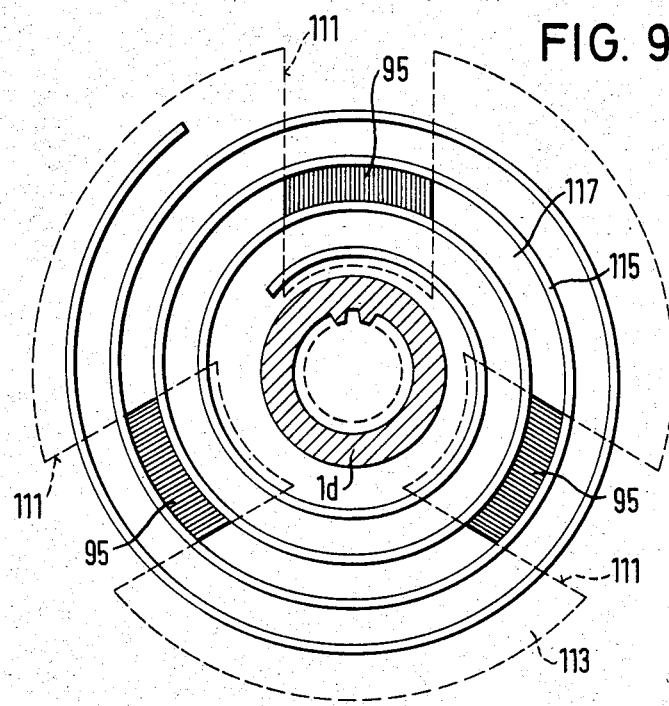
FIG. 9 shows an axial cross-section through the friction damper seen along a line IX—IX in FIG. 8.
Figure 8:
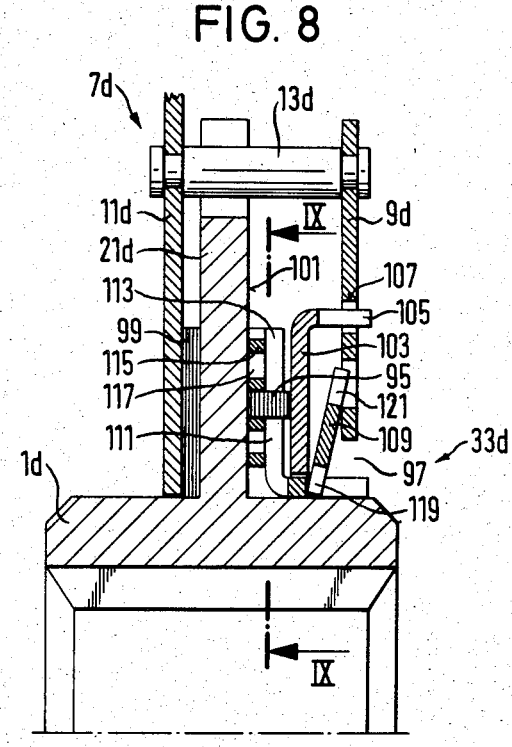
FIG. 8 shows an axial longitudinal section through a friction damper usable in the clutch disc according to FIG. 1, the friction segment of which damper is guided radially displaceably in a groove of spiral form.

FIGS. 8 and 9 show a friction damper 33d having a plurality of friction segments 95 adjustable in common in a predetermined manner.

The friction lining carrier 7d is guided rotatably but axially displaceably on the hub 1d by means of its side disc 11d. The side disc 9d held by means of distance rivets 13d on the side disc 11d forms an annular gap 97 between its internal circumference and the hub 1d. A friction ring 99 is seated axially between the hub flange 21d and the side disc 11d. The friction segments 95 are clamped in between the face 101 of the hub flange 21d lying axially opposite to the friction ring 99 and a thrust ring 103 arranged axially between the hub flange 21d and the side disc 9d. On its external circumference the thrust ring 103 carries tabs 105 which engage in apertures 107 of the side disc 9d and guide the thrust ring 103 non-rotatably but axially displaceably on the side disc 9d. A dished spring 109 which is supported with its internal circumference through the thrust ring 103 and the friction segments 95 on the face 101 of the hub flange 21d and is supported with its external circumference through the side disc 9d, the distance rivets 13d, the side disc 11d and the friction ring 99 on the axially opposite side of the hub flange 21d is braced in axially between the thrust ring 103 and the side disc 9d.

The friction segments 95 are seated radially displaceably in radial slots 111 of a guide disc 113 arranged axially between the hub flange 21d and the thrust ring 103 and are guided rotatably on the hub 1d. The friction face 101 of the hub flange 21d carries a guide rib 115 of spiral form forming a spiral guide groove 117 between its turns in which the friction segments 95 are displaceable in the circumferential direction. By rotation of the guide disc 111 in relation to the hub flange 21d, the friction segments 95 are displaced along the guide groove 117 and thus radially movably adjusted. The friction torque is also adjusted in accordance with the effective friction force radius of the friction segments 95.

On its internal circumference the dished spring carries detent elements 119 which couple it non-rotatably with the guide disc 113. On the external circumference of the dished spring 109 there are provided detent elements 121 by means of which the dished spring 109 can be detained on the side disc 9d in several angular positions. The detent engagement of the dished spring 109 can be released and the dished spring 109 together with the guide disc 113 can be rotated in relation to the hub 1d for the adjustment of the friction torque, by means of a tool or the like introducible through the annular gap 97.

FIGS. 10 and 11 show a friction damper 33e having a friction ring 125 enclosing the hub 1e, which ring is adjustable through an eccentric drive radially of the friction face 127 normal to the axis, formed by the hub flange 21e.

The friction lining carrier 7e is guided rotatably but axially displaceably on the hub 1e through its side disc 11e. The side disc 9e is secured through the distance rivets 13e to the side disc 11e and forms an annular gap 129 between its internal circumference and the hub 1e. A friction ring 131 is arranged axially between the side disc 11e and the hub flange 21e. The friction ring 125 is secured on its side axially remote from the hub flange 21e to a thrust ring 133. An axially resilient dished spring 135 is braced in axially between the thrust ring 133 and the side disc 9e.

The thrust ring 133 carries two guide tongues 137 lying diametrically oppositely in relation to the rotation axis 5e, which tongues engage in radial slots 139 of the side disc 9e and guide the thrust ring 133 and thus the friction ring 125 non-rotatably but both axially and radially displaceably on the side disc 9e.

The thrust ring 133 has a guide opening 141 arranged eccentrically in relation to the friction ring 125, in which an eccentric ring 143 seated rotationally adjustably on the hub 1e is rotatably guided. The eccentricities of the eccentric ring 143 and the guide opening 141 are dimensioned so that the friction ring 125 is radially displaceable by twice the eccentricity out of the position concentric with the rotation axis 5e by a rotation of the eccentric ring 143 through 180°. By rotation of the eccentric ring 143 by means of a tool or the like introducible through the annular gap 129, the friction ring 125 can be displaced radially and thus the effective friction force radius and the friction torque can be adjusted. After adjustment the eccentric ring 143 is secured against rotation, for example by spot welds 145 or by adhesion or swaging.

FIGS. 12 and 13 show a friction damper 33f in which the friction torque of the friction damper 33f can be adjusted by rotation of two friction elements in relation to the rotation axis 5f.

The friction lining carrier 7f is guided rotatably but axially displaceably on the hub 1f by means of its side disc 11f. The side disc 9f is held on the side disc 11f by distance rivets 13f and forms an annular gap 151 between its internal circumference and the hub 1f. A friction ring 153 is arranged axially between the side disc 11f and the hub flange 21f. A substantially elliptical friction ring 155 is secured on the side of the hub flange 21f axially remote from the friction ring 153. A thrust ring 157, carrying a likewise substantially elliptical ring elevation 159 on its side axially facing the friction ring 155, is guided rotatably but axially displaceably on the hub 1f axially between the friction ring 155 and the side disc 9f. The ring elevation 159 forms a friction face of ring form corresponding as regards the size and ratio of its half axes to the friction ring 155. A dished spring 161 is braced in axially between the thrust ring 157 and the side disc 9f. The dished spring 161 is coupled through detent elements 163 on its internal circumference non-rotatably with the thrust ring 157 and through detent elements 165 on its external circumference non-rotatably with the side disc 9f. The dished spring 161 detains the thrust ring 157 non-rotatably but axially displaceably on the side disc 9f in several angle positions.

By rotation of the thrust ring 157 the elliptical friction face 159 is rotated in relation to the friction ring 155. The rotation axis distances of the overlap zones 166 responsible for the friction torque, and thus the friction torque, vary correspondingly.

The friction torque varies slightly also in the vibration damping operation. If such a variation is undesired the friction torque variation of operation in damping can be kept within predetermined permissible tolerance limits by suitable dimensioning of the friction properties of the friction damper.

While specific embodiments of the invention have been shown and described in detail to illustrate the application of the inventive principles, it will be understood that the invention may be embodied otherwise without departing from such principles.

We claim:

1. In a clutch disc for a motor vehicle friction clutch comprising a hub, a friction lining carrier mounted on the hub rotatably through a limited angle of rotation in relation to the hub about its axis of rotation, a torsional vibration spring means arranged in the torque transmission path between hub and friction lining carrier, at least one torsion vibration friction damper having at least two friction elements lying axially resiliently flat against one another, of which elements one is connected non-rotatably with the hub and the other with the friction lining carrier, the improvement comprising one of the friction elements being adjustably moveable along the friction face of the other friction element on one of the hub and the friction lining carrier, in such a way that the mutually overlapping friction faces of the friction elements are adjustable radially in relation to the rotation axis.

2. A clutch disc according to claim 1, in which the hub and the friction lining carrier each carry non-rotatably at least one substantially radially extending disc part, wherein one of the two friction elements resting flat against one another is formed as a friction segment, and is guided non-rotatably but radially displaceably on one of the disc parts.

3. A clutch disc according to claim 2, wherein the radially displaceable friction segment carries on its side axially remote from the other friction element at least one axially protruding protuberance which is guided in a radial slot of the disc part.

4. A clutch disc according to claim 3, wherein the protuberance is an offset tab and is guided on an axially outwardly situated disc part.

5. A clutch disc according to claim 3, wherein the protuberance is an arched spring with at least one leg resilient in the circumferential direction of the disc part and wherein several detent elements arranged with spacing from one another in the radial direction are provided on at least one of the edges of the slot for the radial fixing of the friction element.

6. A clutch disc according to claim 5, wherein the resilient leg is inclined, at least in the region of the edge of the slot abutting on it, axially outwards obliquely to the other edge of the slot, for the generation of the spring stress of the friction elements.

7. A clutch disc according to claim 6, in which the friction lining carrier carries disc parts axially on both sides of a hub flange protruding substantially radially from the hub, wherein radially displaceable friction elements with arched springs generating the axial stress are arranged axially on both sides of the hub flange.

8. A clutch disc according to claim 2, in which the hub carries non-rotatably a substantially radially protruding hub flange and the friction lining carrier carries non-rotatably annular side discs arranged axially on both sides of the hub flange, and in which an axially acting spring is braced in axially between one of the side discs and the hub flange, wherein the hub flange and at least one of the side discs are inclined axially towards one another radially outwards and form between them a radially outwardly narrowing gap in which the friction element is radially displaceably guided.

9. A clutch disc according to claim 8, wherein the spring is a dished spring and is braced in, together with a friction ring and a thrust ring between the hub flange and the side disc arranged on the side of the hub flange axially remote from the gap, said thrust ring being arranged axially between the dished spring and the friction ring and being guided non-rotatably but axially displaceably on one of the hub and the friction lining carrier.

10. A clutch disc according to claim 2, wherein the friction segment is on the one hand guided displaceably in the longitudinal direction of a guide groove of spiral form extending around the rotation axis of said hub and on the other hand is guided radially displaceably on a radial guide connected non-rotatably with one of the disc parts, said spiral guide groove and said radial guide being rotationally adjustable in relation to one another about the rotation axis.

11. A clutch disc according to claim 10, wherein the groove of spiral form is provided non-rotatably on one of the disc parts, wherein the radial guide is provided on an annular guide disc rotatable in relation to the other disc part and wherein the guide disc is detainable on the other disc part in several angle positions.

12. A clutch disc according to claim 11, wherein the radial guide is formed as a radial slot, wherein the friction segment is arranged in the slot and abuts on the side axially remote from the spiral groove on a thrust ring and wherein a dished spring is braced in axially between the thrust ring and the axially adjacent other side disc, said dished spring being provided both on its internal circumference and on its external circumference with detent elements for the non-rotatable detention of the guide disc on this side disc.

13. A clutch disc according to claim 1, where the hub and the friction lining carrier carry non-rotatably substantially radially extending disc parts, wherein at least one of the two friction elements lying flat against one another is formed as a friction ring enclosing the rotation axis and is guided non-rotatably but radially displaceably on one of the disc parts, and wherein the friction ring is mounted rotatably on a radially eccentric ring which in turn is held non-rotatably but rotatably adjustably about the rotation axis on the other disc part.

14. A clutch disc according to claim 13, wherein the friction ring is guided on the friction lining carrier and the eccentric ring is mounted rotatably on the hub.

15. A clutch disc according to claim 1, in which the hub and the friction lining carrier carry non-rotatably substantially radially extending disc parts, wherein the two friction elements lying flat against one another have elongated friction faces extending at an angle to one another and one of the friction elements is guided non-rotatably but rotationally adjustably about the rotation axis on one of the disc parts.

16. A clutch disc according to claim 15, wherein the friction elements are formed as friction rings with radial distance from the rotation axis varying in the circumferential direction.

17. A clutch disc according to claim 16, wherein the friction rings have a substantially elliptical form.

18. A clutch disc according to claim 15, wherein one of the friction elements is formed as a thrust ring with friction face protruding axially to the other friction element and is detainable by means of a dished spring in several angular positions on the side disc of the friction lining carrier.

19. A clutch disc according to claim 1, in which the hub and the friction lining carrier each carry non-rotatably at least one substantially radially extending disc part, wherein one of the two friction elements resting flat against one another is formed as a friction segment, and is guided non-rotatably but radially displaceably on a ring part connected non-rotatably with one of the disc parts.

20. A clutch disc according to claim 19, wherein the radially displaceable friction segment carries on its side axially remote from the other fricton element at least one axially protruding protruberance which is guided in a radial slot of the ring part connected non-rotatably with the disc part.

21. A clutch disc according to claim 20, wherein the protuberance is an arched spring with at least one leg resilient in the circumferential direction of the ring part connected non-rotatably with the disc part, and wherein several detent elements arranged with spacing from one another in the radial direction are provided on at least one of the edges of the slot for the radial fixing of the friction element.

22. A clutch disc according to claim 1, where the hub and the friction lining carrier carry non-rotatably radially extending disc parts, wherein at least one of the two friction elements lying flat against one another is formed as a friction ring enclosing the rotation axis and is guided non-rotatably but radially displaceably on one of the disc parts, and wherein the friction ring is mounted rotatably on a radially eccentric ring which in turn is held non-rotatably but rotatably adjustably about the rotation axis on the hub connected with the other disc part.

23. A clutch disc according to claim 1, where the hub and the friction lining carrier carry non-rotatably substantially radially extending disc parts, wherein at least one of the two friction elements lying flat against one another is formed as a friction ring enclosing the rotation axis and is guided non-rotatably but radially displaceably on one of the disc parts, and wherein the friction ring is mounted rotatably on a radially eccentric ring which in turn is held non-rotatably but rotatably adjustably about the rotation axis on the friction lining carrier connected with the hub.

* * * * *